United States Patent
Hikata et al.

(10) Patent No.: US 10,767,282 B2
(45) Date of Patent: Sep. 8, 2020

(54) METHOD FOR MANUFACTURING CARBON NANOSTRUCTURE, AND DEVICE FOR MANUFACTURING CARBON NANOSTRUCTURE

(71) Applicant: SUMITOMO ELECTRIC INDUSTRIES, LTD., Osaka-shi, Osaka (JP)

(72) Inventors: Takeshi Hikata, Osaka (JP); Soichiro Okubo, Osaka (JP); Ryusuke Nakai, Osaka (JP); Daisuke Tanioka, Osaka (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 283 days.

(21) Appl. No.: 15/774,602

(22) PCT Filed: Jul. 21, 2016

(86) PCT No.: PCT/JP2016/071336
§ 371 (c)(1),
(2) Date: May 9, 2018

(87) PCT Pub. No.: WO2017/081889
PCT Pub. Date: May 18, 2017

(65) Prior Publication Data
US 2018/0327934 A1    Nov. 15, 2018

(30) Foreign Application Priority Data
Nov. 11, 2015 (JP) .................. 2015-221556

(51) Int. Cl.
| C23C 8/20 | (2006.01) |
| D01F 9/127 | (2006.01) |
| D01F 9/133 | (2006.01) |
| B82Y 40/00 | (2011.01) |

(52) U.S. Cl.
CPC ............. *D01F 9/1275* (2013.01); *C23C 8/20* (2013.01); *D01F 9/133* (2013.01); *B82Y 40/00* (2013.01)

(58) Field of Classification Search
CPC .... C23C 8/20; C23C 8/22; C23C 8/30; C23C 8/32
See application file for complete search history.

(56) References Cited

U.S. PATENT DOCUMENTS

2013/0302552 A1* 11/2013 Hikata ................ B01J 4/008
428/57
2016/0002041 A1    1/2016 Hikata et al.

FOREIGN PATENT DOCUMENTS

| JP | 2005-330175 A | 12/2005 |
| JP | 2008-74658 A | 4/2008 |
| JP | 2013-11039 A | 1/2013 |
| JP | 2013-237572 A | 11/2013 |
| JP | 2015-96454 A | 5/2015 |
| WO | WO-2014/132724 A1 | 9/2014 |

OTHER PUBLICATIONS

Takeshi Hikata et al., "Novel CNFs bridging grown with formation of cracks under heat treatment," The 60th JSAP Spring Meeting Abstracts, The Japan Society of Applied Physics, Mar. 11, 2013, 28a-G12-7, 1 page.
Takeshi Hikata et al., "Novel Carbon Nanofibers Bridge-Grown in Carburized Iron Substrate," SEI Technical Review, Jul. 2017, pp. 105-110, No. 185.
Takeshi Hikata et al., "Novel Bridged Carbon Nanofibers Grown by Cleaving Carburized Iron Substrates," SEI Technical Review, Oct. 2014, pp. 102-106, No. 79.

* cited by examiner

*Primary Examiner* — Jessee R Roe
(74) *Attorney, Agent, or Firm* — Faegre Drinker Biddle & Reath LLP

(57) ABSTRACT

A method for manufacturing a carbon nanostructure according to an embodiment of the present invention is a method for manufacturing a carbon nanostructure, the method including a preparation step of preparing a substrate containing a carburizable metal as a main component, and a carbon nanostructure growth step of supplying a carbon-containing gas while heating the substrate, in which the carbon nanostructure growth step includes gradually cleaving a heated portion of the substrate. The cleaving in the carbon nanostructure growth step is preferably performed by subjecting the substrate to shearing. The heating in the carbon nanostructure growth step is preferably performed by irradiating a cleaving portion of the substrate with a laser. The preparation step preferably includes forming, in the substrate, a notch for inducing cleavage. Preferably, the substrate in the carbon nanostructure growth step is not oxidized.

6 Claims, 4 Drawing Sheets

METHOD FOR MANUFACTURING CARBON NANOSTRUCTURE, AND DEVICE FOR MANUFACTURING CARBON NANOSTRUCTURE

TECHNICAL FIELD

The present invention relates to a method for manufacturing a carbon nanostructure and a device for manufacturing a carbon nanostructure.

The present application claims priority from Japanese Patent Application No. 2015-221556 filed on Nov. 11, 2015, and the entire contents of the Japanese patent application are incorporated herein by reference.

BACKGROUND ART

Carbon nanostructures such as linear carbon nanotubes and sheet-like graphene are known to date in which carbon atoms are arranged in parallel at intervals on the order of nanometers. Such carbon nanostructures are obtained by, for example, a method including supplying a source gas containing carbon while heating a fine catalyst such as iron to thereby grow carbon nanostructures from the catalyst (refer to, for example, Japanese Unexamined Patent Application Publication No. 2005-330175).

In the above existing manufacturing method, during the growth of carbon nanofilaments constituting the carbon nanostructures, it is difficult to control a growth direction from the catalyst, and kinks of the grown carbon nanofilaments easily occur. The occurrence of such kinks generates structural defects such as a five-membered ring and a seven-membered ring in the carbon nanofilaments, resulting in a local increase in the resistance or the like. In addition, it becomes difficult to bundle a plurality of carbon nanofilaments at a high density.

In view of the above, a method has been proposed in which a catalyst is oxidized, and the oxidized catalyst is divided while being subjected to carburizing heat treatment to thereby grow carbon nanofilaments between the resulting divided surfaces (refer to Japanese Unexamined Patent Application Publication No. 2013-237572).

CITATION LIST

Patent Literature

PTL 1: Japanese Unexamined Patent Application Publication No. 2005-330175
PTL 2: Japanese Unexamined Patent Application Publication No. 2013-237572

SUMMARY OF INVENTION

A method for manufacturing a carbon nanostructure according to an embodiment of the present invention is a method for manufacturing a carbon nanostructure, the method including a preparation step of preparing a substrate containing a carburizable metal as a main component, and a carbon nanostructure growth step of supplying a carbon-containing gas while heating the substrate. In the method, the carbon nanostructure growth step includes gradually cleaving a heated portion of the substrate.

A device for manufacturing a carbon nanostructure according to another embodiment of the present invention is a device for manufacturing a carbon nanostructure, the device including a hermetically sealed container, a gas supply unit that supplies a carbon-containing gas into the hermetically sealed container, and a heating unit that heats, in the hermetically sealed container, a substrate containing a carburizable metal as a main component. The device includes a plurality of holding parts that hold the substrate, and the plurality of holding parts are configured to be movable so as to gradually cleave the substrate.

DESCRIPTION OF EMBODIMENTS

Technical Problem

Figure 1:
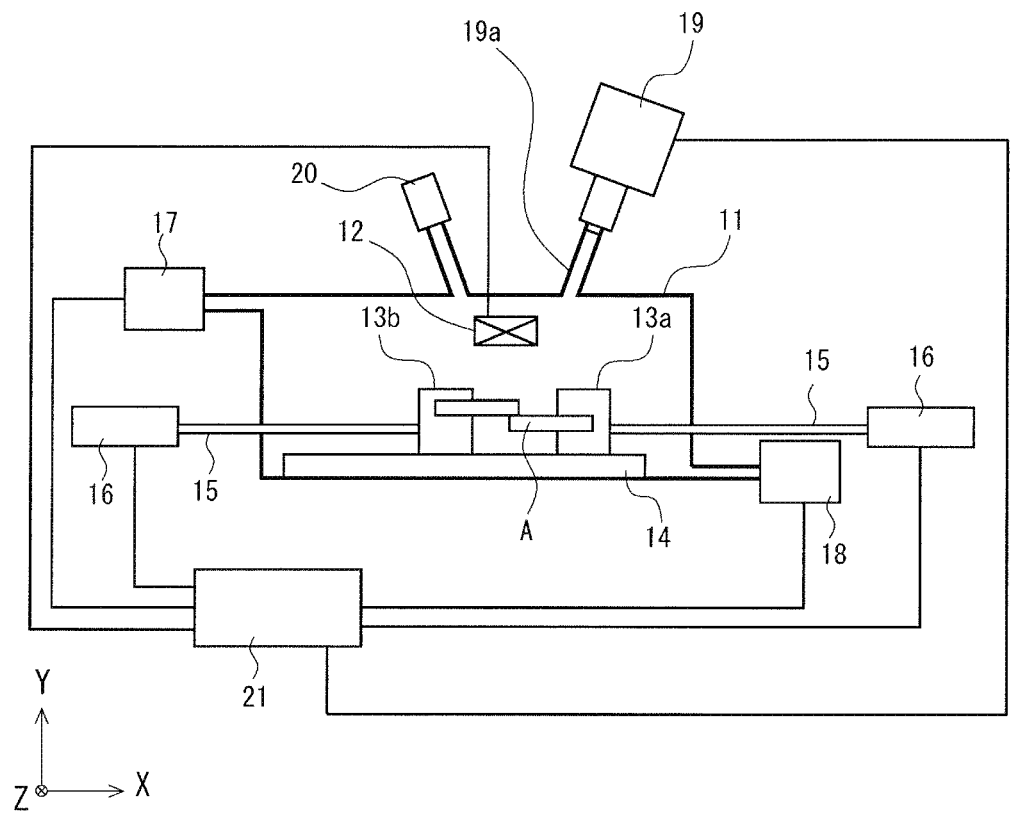
FIG. 1 is a schematic view illustrating a device for manufacturing a carbon nanostructure according to an embodiment of the present invention.

In the above-described method for growing a carbon nanofilament on divided surfaces of an oxidized catalyst, carbon nanofilaments having less kinks can be obtained compared with existing methods. However, in the above existing method, since the dividing positions of the catalyst cannot be controlled, starting points of the growth of carbon nanofilaments tend to be randomly located, and it is difficult to stably grow carbon nanofilaments.

The present invention has been made in view of the circumstances described above. An object of the present invention is to provide a method for manufacturing a carbon nanostructure, the method being capable of stably manufacturing a carbon nanostructure whose deformation such as a kink is suppressed, and a device for manufacturing such a carbon nanostructure.

Advantageous Effects of the Present Disclosure

According to the method for manufacturing a carbon nanostructure and the device for manufacturing a carbon nanostructure according to embodiments of the present invention, a carbon nanostructure whose deformation such as a kink is suppressed can be stably manufactured.

Description of Embodiments of the Present Invention

A method for manufacturing a carbon nanostructure according to an embodiment of the present invention is a method for manufacturing a carbon nanostructure, the method including a preparation step of preparing a substrate containing a carburizable metal as a main component, and a carbon nanostructure growth step of supplying a carbon-containing gas while heating the substrate. In the method, the carbon nanostructure growth step includes gradually cleaving a heated portion of the substrate.

As a result of extensive studies, the inventors of the present invention found that when a carburizable metal substrate is gradually cleaved while heating the substrate and supplying a carbon-containing gas, carbon nanostructures can be selectively grown in a cleaving portion. This finding led to the realization of the present invention. That is, according to the method for manufacturing a carbon nanostructure, since carbon nanostructures can be selectively grown in a portion where a substrate is cleaved, the carbon nanostructures can be stably manufactured. In addition, in the method for manufacturing a carbon nanostructure, since carbon nanostructures are grown from a cleaving portion serving as starting points in a state where a certain tension is applied, deformation such as a kink of the carbon nanostructures is suppressed. Furthermore, in the method for manufacturing a carbon nanostructure, since the substrate need not be oxidized, the cost for manufacturing carbon nanostructures can be significantly reduced. The term "main component" refers to a component having the highest content and refers to a component contained in an amount of, for example, 50% by mass or more. The expression "gradually cleaved" means that cleaving is performed at a rate at which a carbon nanostructure (carbon nanofilament) that grows on surfaces of a substrate is not divided.

The cleaving in the carbon nanostructure growth step is preferably performed by subjecting the substrate to shearing. When the cleaving is performed by shearing, the cleaving of the substrate can be relatively easily performed, and the cleavage rate and the like can be easily adjusted. Thus, high-quality carbon nanostructures can be more stably manufactured.

The heating in the carbon nanostructure growth step is preferably performed by irradiating a cleaving portion of the substrate with a laser. When a cleaving portion of the substrate is irradiated with a laser, growth of carbon nanostructures in portions other than the cleaving portion is suppressed, and carbon nanostructures can be selectively grown in the cleaving portion more reliably. The term "cleaving portion" refers to a portion where cleaving is proceeding.

The preparation step preferably includes forming, in the substrate, a notch for inducing cleavage. Such a notch formed in the substrate facilitates the cleaving of the substrate, and thus carbon nanostructures can be more stably manufactured.

Preferably, the substrate in the carbon nanostructure growth step is not oxidized. When the substrate is not oxidized, occurrence of, for example, division of the substrate at an unintended position is prevented, and carbon nanostructures can be selectively grown in the cleaving portion more reliably.

The method preferably further includes an observation step of observing a cleaving portion in the carbon nanostructure growth step. In the method for manufacturing a carbon nanostructure, carbon nanostructures are selectively grown in the cleaving portion, and the growth position can be predicted. Thus, the observation is easily performed. Accordingly, the method including the step of observing a cleaving portion enables high-quality carbon nanostructures to be manufactured more stably.

A device for manufacturing a carbon nanostructure according to another embodiment of the present invention is a device for manufacturing a carbon nanostructure, the device including a hermetically sealed container, a gas supply unit that supplies a carbon-containing gas into the hermetically sealed container, and a heating unit that heats, in the hermetically sealed container, a substrate containing a carburizable metal as a main component. The device includes a plurality of holding parts that hold the substrate, and the plurality of holding parts are configured to be movable so as to gradually cleave the substrate.

The device for manufacturing a carbon nanostructure enables carbon nanostructures to be selectively grown in a portion where a substrate is cleaved. Therefore, the carbon nanostructures can be stably manufactured. In addition, in the device for manufacturing a carbon nanostructure, since carbon nanostructures are grown from a cleaving portion serving as starting points, deformation such as a kink of the carbon nanostructures can be suppressed. Furthermore, in the device for manufacturing a carbon nanostructure, since the substrate need not be oxidized, the cost for manufacturing carbon nanostructures can be significantly reduced.

A heating source of the heating unit is preferably a laser. When a cleaving portion of the substrate is subjected to laser irradiation by using a laser as a heating source, carbon nanostructures can be selectively grown in the cleaving portion more reliably.

The device preferably further includes an observation unit for observing a cleaving portion of the substrate. When the device includes an observation unit for a cleaving portion, high-quality carbon nanostructures can be more stably manufactured.

Details of Embodiments of the Present Invention

Hereinafter, embodiments of the present invention will be described in detail with reference to the drawings.

The method for manufacturing a carbon nanostructure includes (1) a preparation step of preparing a substrate containing a carburizable metal as a main component, and (2) a carbon nanostructure growth step of supplying a carbon-containing gas while heating the substrate.

The method for manufacturing a carbon nanostructure may further include (3) an observation step of observing a cleaving portion in the carbon nanostructure growth step.

The method for manufacturing a carbon nanostructure can be suitably performed by using, for example, a device for manufacturing a carbon nanostructure according to an embodiment of the present invention, the device being illustrated in FIG. 1.

<Device for Manufacturing Carbon Nanostructure>

The device for manufacturing a carbon nanostructure illustrated in FIG. 1 mainly includes a reaction chamber 11 which is a hermetically sealed container, a heater 12 disposed in the reaction chamber 11, a pair of holding parts (a first holding block 13a and a second holding block 13b) that is disposed so as to face the heater 12 and that holds end portions of a plate-like substrate A, a base member 14 for supporting the substrate A and the pair of holding blocks, a pair of driving units 16 connected to the pair of holding blocks with connecting rods 15 therebetween, a gas supply unit 17 for supplying the reaction chamber 11 with a carbon-containing gas or the like, and a gas discharge unit 18 for discharging a gas from the reaction chamber 11. The manufacturing device illustrated in FIG. 1 further includes a laser beam oscillator 19 functioning as a heating unit that locally heats the substrate A in the reaction chamber 11, an observation unit 20 for observing a cleaving portion of the substrate A, and a control unit 21 for controlling the heater 12, the driving units 16, the gas supply unit 17, the gas discharge unit 18, and the laser beam oscillator 19.

Figure 2:
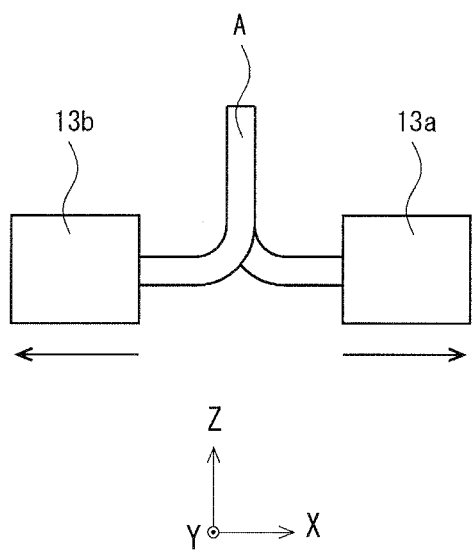
FIG. 2 is a schematic view of holding blocks of the manufacturing device in FIG. 1, viewed from above (Y direction).

In the reaction chamber 11, the pair of first holding block 13a and second holding block 13b is disposed on an upper surface of the base member 14. The strip-shaped substrate A is supported by the base member 14 using a supporting member (not shown) such that a width direction is directed in the vertical direction (the Y direction in the figure). The first holding block 13a and the second holding block 13b are configured to hold portions of the same end portion (one end portion) of the strip-shaped substrate A, the portions being separated from each other in the width direction (the Y direction in the figure), and to be relatively movable such that the holding portions are gradually separated from each other in a thickness direction (the X direction in the figure) of the substrate A, as illustrated in FIGS. 1 and 2. Specifically, the first holding block 13a and the second holding block 13b gradually apply a shear stress to the substrate A in the thickness direction. This shearing gradually cleaves the substrate A in the longitudinal direction from a starting point between the portions held by the pair of holding blocks and divides the substrate A into a plurality of (in FIGS. 1 and 2, two) strip-shaped bodies.

The heater 12 is disposed above the substrate A in the reaction chamber 11. When a wall of the reaction chamber 11 is formed by a translucent member made of quartz or the like, the heater 12 may be disposed outside the reaction chamber 11. Any heating device such as an electric heater can be used as the heater 12.

The pair of driving units 16 are connected to the first holding block 13a and the second holding block 13b that hold the end portions of the substrate A with the pair of connecting rods 15 therebetween and move the holding blocks in a horizontal direction so as to be parallel to the axis of the connecting rods 15, thus cleaving the substrate A as described above.

The laser beam oscillator 19 is a heating source that locally heats a portion, preferably, a cleaving portion of the substrate A. Specifically, an opening is formed in an upper wall surface of the reaction chamber 11, and a tubular laser beam introduction unit 19a is connected to the opening. A laser beam oscillated from the laser beam oscillator 19 is applied to the substrate A in the reaction chamber 11 through the laser beam introduction unit 19a.

The laser beam applied to the substrate A is preferably infrared rays. Specifically a laser beam having a wavelength of 900 nm or more and 1,000 nm or less is preferred. The laser irradiation diameter may be, for example, 1 mm or more and 10 mm or less.

The observation unit 20 is a device for observing a cleaving portion of the substrate A. The observation unit 20 is not limited as long as the growth of carbon nanostructures can be confirmed. For example, an optical microscope, a thermography, or the like can be used.

(1) Preparation Step

In this step, a substrate A containing a carburizable metal as a main component is prepared. Such a metal is preferably a metal that forms a solid solution with carbon. Besides, any metal capable of being carburized from a surface thereof may also be used. Examples of such a metal that forms a solid solution with carbon preferably include iron, nickel, and cobalt. In view of the cost, iron is preferred. Furthermore, among irons, pure iron having a purity of 4N or higher is preferred. The substrate A may contain additives and the like other than the above metal within a range that does not impair the advantageous effects of the present invention.

The shape of the substrate A is not limited as long as the substrate A can be subjected to shearing but is preferably a long, narrow sheet shape (strip shape). The average thickness of the substrate A may be, for example, 10 μm or more and 1 mm or less.

From the viewpoint of controlling a cleaving site, which is a growth portion of a carbon nanostructure, preferably, the substrate A is not oxidized. If the substrate A is oxidized, the substrate A becomes brittle, and division may occur at an unintended position. Specifically, a rate of increase in the volume of the substrate A due to oxidation relative to an unoxidized substrate having the same volume is preferably 15% or less, more preferably 5% or less, and still more preferably 0%.

Figure 3:
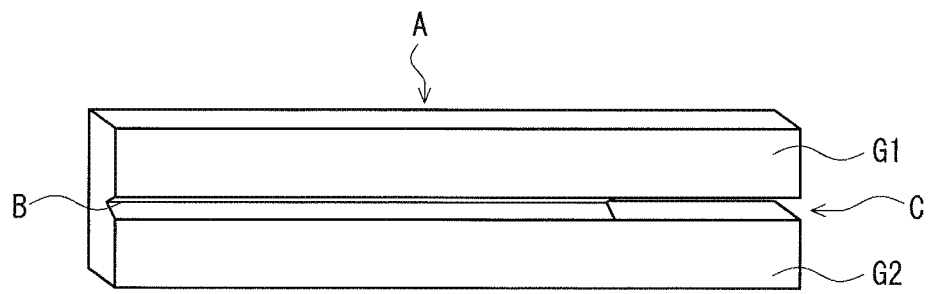
FIG. 3 is a schematic perspective view illustrating a substrate used in a method for manufacturing a carbon nanostructure according to an embodiment of the present invention.

This step preferably includes forming, in the substrate A, a notch B for inducing cleavage as illustrated in FIG. 3. Specifically, a groove-shaped notch B having a depth in the thickness direction is preferably formed in the longitudinal direction of the substrate A. In the portion where the thickness is reduced by the notch B, breakage easily occurs, and thus the substrate A easily cleaves along the notch B. As a result, a cleaving position of the substrate A, which is a growth starting point of a carbon nanostructure, is easily adjusted.

The average width of the notch B is not particularly limited and may be, for example, 10 μm or more and 500 μm or less. The average depth of the notch B is not particularly limited and may be, for example, 10% or more and 80% or less relative to the average thickness of the substrate A. The term "average depth of the notch B" refers to the average of the maximum depth at arbitrary 10 points of the notch B in the longitudinal direction.

Furthermore, a first holding portion G1 of the substrate A held by the first holding block 13a and a second holing portion G2 of the substrate A held by the second holding block 13b are preferably separated from each other by a slit C. The slit C is formed so as to continue from the notch B and extend in the longitudinal direction (cleavage direction) of the substrate A, and reaches an end portion of the substrate A. This slit C divides the end portion of the substrate A into two portions in the width direction. This slit C enables the cleaving of the substrate A to occur more easily.

(2) Carbon Nanostructure Growth Step

In this step, while heating the substrate A and supplying a carbon-containing gas, a heated portion of the substrate A is gradually cleaved. Specifically, the first holding block 13a that holds the first holding portion G1 of the substrate A and the second holding block 13b that holds the second holing portion G2 of the substrate A are horizontally gradually moved by the driving units 16 such that the holding blocks are separated from each other. Thus, a tension is applied to the end portion of the substrate A so that the substrate A is gradually subjected to shearing in the longitudinal direction. As a result, the substrate A is gradually cleaved in the longitudinal direction. At this time, a cleaving portion of the substrate A is irradiated with a laser beam oscillated from the laser beam oscillator 19 to locally heat the cleaving portion. Furthermore, a carbon-containing gas is supplied from the gas supply unit 17 to the substrate A in this state.

The first holding block 13a and the second holding block 13b are preferably moved at the same speed. During the cleaving, the substrate A is preferably moved such that the cleaving portion of the substrate A is present at the irradiation position of the laser beam. By moving the substrate A in this manner, the cleaving portion can be constantly selectively heated without moving the laser beam oscillator 19.

In this step, since carbon nanostructures can be selectively grown in the portion where the substrate A is cleaved, the carbon nanostructures can be stably manufactured. In addition, since carbon nanostructures are grown from the cleaving portion serving as starting points in a state where a certain tension is applied, deformation such as a kink of the carbon nanostructures is suppressed. Furthermore, in the method for manufacturing a carbon nanostructure, since the substrate need not be oxidized, the cost for manufacturing carbon nanostructures can be significantly reduced.

In addition, since the substrate A is cleaved by shearing, the cleaving of the substrate A can be relatively easily performed, and the cleavage rate and the like are easily adjusted. Accordingly, high-quality carbon nanostructures can be more stably manufactured. Furthermore, since the cleaving portion of the substrate A is selectively irradiated with a laser, growth of carbon nanostructures in portions other than the cleaving portion is suppressed, and carbon nanostructures can be selectively grown in the cleaving portion more reliably. The cleaving may be performed not only when the temperature of the substrate A becomes constant but also during an increase in temperature or during a decrease in temperature.

The cleavage rate of the substrate A in the longitudinal direction is adjusted in accordance with, for example, the size of carbon nanostructures to be grown. The lower limit of the cleavage rate is preferably 0.5 µm/s and more preferably 1 µm/s. The upper limit of the cleavage rate is preferably 100 µm/s and more preferably 10 µm/s. When the cleavage rate is lower than the lower limit, manufacturing efficiency of carbon nanostructures decreases, and the manufacturing cost may be increased. In contrast, when the cleavage rate exceeds the upper limit, long carbon nanostructures may not be obtained.

The output of the laser heating may be, for example, 1 W or more and 50 W or less. The carburizing heating time may be, for example, 1 minute or more and 10 hours or less. When the heating time exceeds 10 hours, the metal is easily deformed by excessive carburization. The heating temperature is, for example, 800° C. or higher and 1,150° C. or lower. Furthermore, the laser irradiation is preferably adjusted such that the temperature of growth starting points of carbon nanostructures during the cleaving becomes constant.

As the carbon-containing gas, a gas having reducing properties, such as a hydrocarbon gas, is used. For example, a mixed gas of acetylene and nitrogen or argon can be used. In the case of using a gas containing acetylene, the gas preferably has a low acetylene concentration so as to prevent amorphous carbon from adhering to surfaces of carbon nanostructures. The lower limit of the acetylene concentration in the mixed gas is preferably 0.1% by volume and more preferably 1% by volume. The upper limit of the acetylene concentration is preferably 20% by volume and more preferably 5% by volume. When the acetylene concentration is lower than the lower limit, long carbon nanostructures may not be efficiently obtained. In contrast, when the acetylene concentration exceeds the upper limit, amorphous carbon may adhere to surfaces of carbon nanostructures, and the filament diameters may increase.

Figure 4:
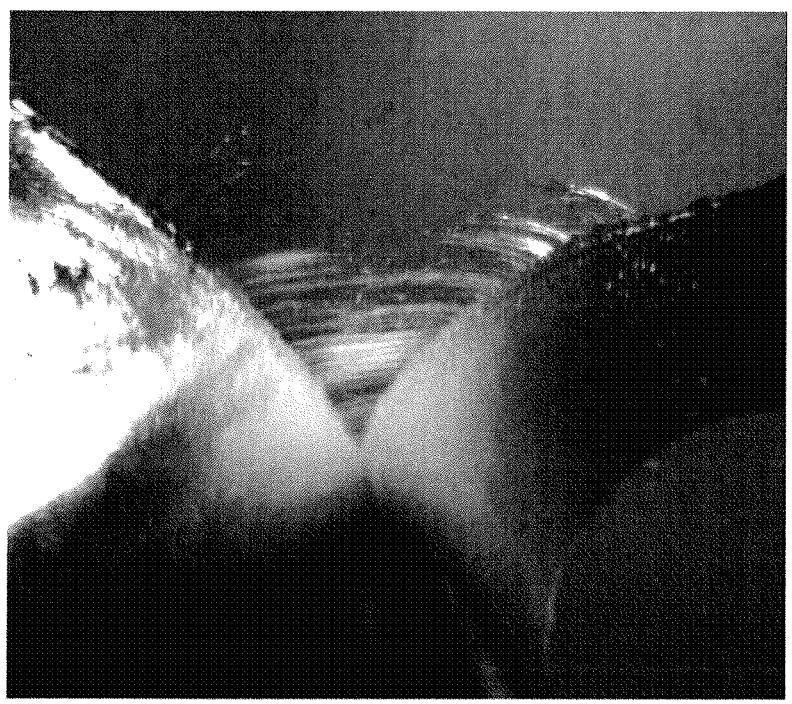
FIG. 4 is an example of an image observed with a microscope during a carbon nanostructure growth step in Test Example 1.

Through the operation described above, carbon nanofilaments are grown between end faces of the cleaving portion of the substrate A, as shown in FIG. 4. Specifically, while the cleaving end faces of the substrate A are mainly carburized, carbon nanofilaments are continuously grown from the end faces. That is, in the present invention, the substrate A is heated and a source gas is supplied to thereby cause carburization to sequentially proceed from surfaces of the substrate A. Next, the substrate A is cleaved to thereby grow carbon nanofilaments connecting between divided end faces. By causing this cleaving to gradually proceed, the distance between the end faces on which the carbon nanofilaments are formed is gradually increased to grow the carbon nanofilaments. Furthermore, new end faces are formed by the cleaving, and new carbon nanofilaments are generated on the end faces.

Portions of the substrate A, the portions not contributing to the growth of carbon nanofilaments, are preferably cooled with a cooler (not shown). Furthermore, a carbon-containing gas may be locally supplied to the cleaving portion of the substrate A by using, for example, a supply pipe through which the carbon-containing gas is supplied near the substrate A. With these configurations, carbon nanostructures can be efficiently manufactured.

In addition, an inert gas, such as nitrogen gas, may be supplied as a carrier gas into the reaction chamber 11. In this case, reaction gases (such as carbon monoxide, carbon dioxide, and water) generated from the carbon-containing gas with the formation of carbon nanostructures can be discharged from the reaction chamber 11 without bringing into contact with the carbon nanostructures.

(3) Observation Step

In this step, the cleaving portion in the carbon nanostructure growth step is observed with the observation unit 20. Specifically, the growth process of carbon nanofilaments is checked to adjust conditions such as the cleavage rate, the heating temperature, and the amount of gas supplied. With this configuration, high-quality carbon nanostructures can be more stably manufactured.

The shape of a carbon nanostructure obtained by the method for manufacturing a carbon nanostructure is not particularly limited. The shape of the carbon nanostructure may be, for example, a linear shape, a tubular shape, or a film shape.

Other Embodiments

It is to be understood that the embodiments disclosed herein are only illustrative and are not restrictive in all respects. The scope of the present invention is not limited to the configurations of the embodiments and is defined by the claims described below. The scope of the present invention is intended to cover all the modifications within the meaning and range of equivalency of the claims.

In the method and the device for manufacturing a carbon nanostructure, the substrate may be gradually cleaved by a method other than shearing. Furthermore, when shearing is performed, it is not necessary to move each of a pair of holding blocks that hold end portions of the substrate as in the embodiment described above. Alternatively, one holding block may be fixed, and only the other holding block may be moved. The shearing direction is not limited to the horizontal direction. For example, the substrate may be supported such that the longitudinal direction is directed to the vertical direction, and shearing may be performed in the vertical direction. Alternatively, three or more holding parts may be prepared, and one substrate may be cleaved at a plurality of positions.

The substrate may be heated with only the heater without using a laser. That is, in the device for manufacturing a carbon nanostructure, the laser beam oscillator is not an essential constituent feature. In the present invention, even when the entire substrate is heated with the heater, carbon nanostructures can be selectively grown in the cleaving portion. However, in order to selectively grow carbon nanostructures more reliably, only a part (cleaving portion) of the substrate is preferably heated. Such means for heating a part of the substrate is not limited to a laser. In the case where the heating of the substrate is performed with a laser, the heater in the reaction chamber may be omitted.

In the case where, for example, conditions for growing carbon nanofilaments are known, the observation of the cleaving portion of the substrate is not essential, and thus the observation unit may be omitted in the device for manufacturing a carbon nanostructure.

EXAMPLES

Hereinafter, the present invention will be more specifically described by way of examples. The present invention is not limited to the examples described below.

Test Example 1

Figure 5:
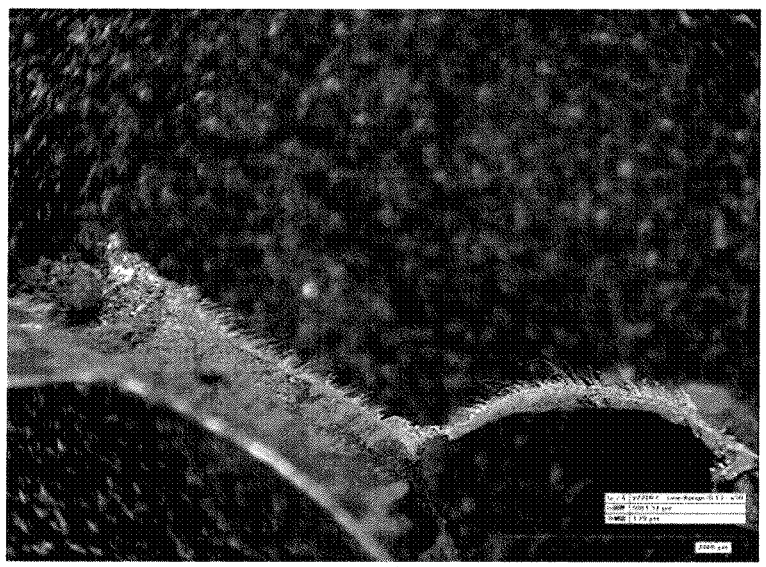
FIG. 5 is a photograph of a substrate after cleaving and resulting carbon nanofilaments in Test Example 1.
Figure 6:
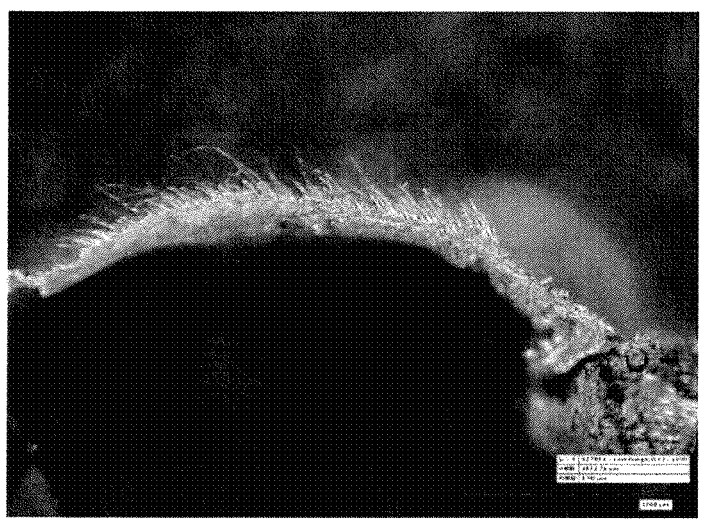
FIG. 6 is a photograph of a substrate after cleaving and resulting carbon nanofilaments in Test Example 1.
Figure 7:
FIG. 7 is a photograph of a substrate after cleaving and resulting carbon nanofilaments in Test Example 1.

A strip-shaped pure iron sheet (purity 4N) having an average thickness of 50 μm, a width of 3 mm, and a length of 15 mm was prepared as a substrate, and a notch and a slit were formed as illustrated in FIG. 3. Next, by using the manufacturing device illustrated in FIG. 1, a pair of holding portions of one end portion of the substrate, the holding portions being divided by the slit, was fixed to holding blocks. Next, the substrate was heated by a laser beam having a wavelength of 940 nm and an irradiation diameter of 1.6 mm while supplying nitrogen gas in a reaction chamber. Subsequently, while supplying a gas containing acetylene and nitrogen and having an acetylene concentration of 5% by volume and while heating the substrate to 900° C. with the laser beam, the pair of holding portions of the substrate was pulled in directions in which the holding portions were separated from each other, to thereby gradually perform shearing along the notch at a rate of 3 μm/s. Fiber-like carbon nanofilaments were grown from the sheared surfaces of the substrate with the extension of a cleaving portion. Thus, carbon nanofilaments having a length of about 1 mm were obtained. The growth of the carbon nanofilaments occurred mainly in the cleaving portion, and the state of the growth could be easily checked with a microscope. FIG. 4 shows an image observed with the microscope. FIGS. 5 to 7 show photographs of the substrate after shearing and the resulting carbon nanofilaments.

Test Example 2

By using the same substrate and manufacturing device as those used in Test Example 1, a pair of holding portions of one end portion of the substrate, the holding portions being divided by a slit, was fixed to holding blocks. Next, the substrate was heated in an air atmosphere by a laser beam having an irradiation diameter of 5 mm, and air was then replaced by nitrogen gas. Through this operation, iron oxide was formed on the surfaces of the substrate, and the volume was increased by about 10% due to expansion. Subsequently, while supplying a gas containing acetylene and nitrogen and having an acetylene concentration of 5% by volume and while heating the substrate to 1,100° C. with the laser beam, the pair of holding portions of the substrate was pulled in directions in which the holding portions were separated from each other, to thereby gradually perform shearing along a notch at a rate of 10 μm/s. Fiber-like carbon nanofilaments were grown from the sheared surfaces of the substrate with the extension of a cleaving portion. Thus, carbon nanofilaments having a length of about 1 mm were obtained.

The comparison between Test Example 1 and Test Example 2 shows that when the substrate is not oxidized, the irradiation diameter of the laser beam can be made small and the heating temperature can also be made low. That is, carbon nanofilaments can be selectively grown in the cleaving portion more reliably.

Test Example 3

Figure 8:
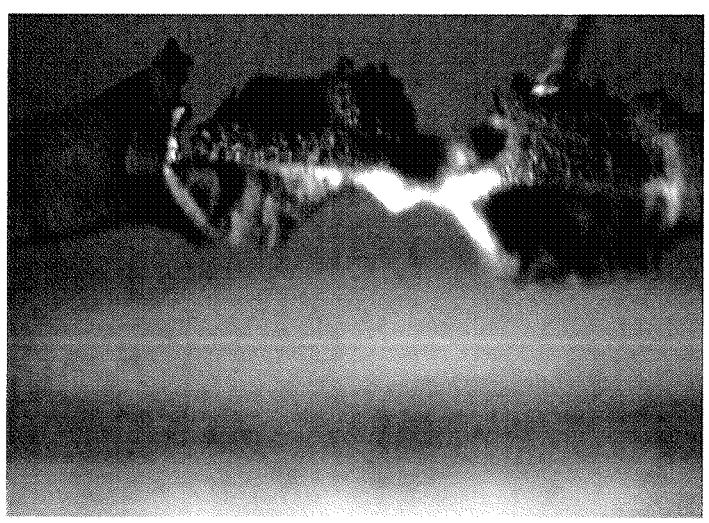
FIG. 8 is a photograph of a substrate after division and resulting carbon nanofilaments in Test Example 3.

A strip-shaped pure iron sheet (purity 4N) having an average thickness of 50 μm, a width of 3 mm, and a length of 15 mm was prepared as a substrate. The substrate was subjected to heat treatment (oxidation treatment) in an air atmosphere in an electric furnace at about 900° C. for 10 minutes. Through this operation, the volume of the substrate expanded to about two times. Next, by using a manufacturing device that included, instead of the holding blocks of the manufacturing device used in Test Example 1, tension blocks configured to pull both end portions of the substrate in opposite directions, the substrate was fixed to the tension blocks, and nitrogen gas was allowed to flow in a reaction chamber to discharge oxygen. Subsequently, while supplying a gas containing acetylene and nitrogen and having an acetylene concentration of 5% by volume and while heating the substrate to 900° C. with the laser beam, the substrate was pulled in the longitudinal direction to be divided. As a result of this division, the substrate was significantly deformed and a large number of cracks were formed, and subsequently, the substrate was broken not in the central portion that had been irradiated with the laser but in the vicinity of an end portion. According to the observation of the cracks and decision broken-out surfaces, short carbon nanofilaments of about several to ten micrometers were merely obtained. Furthermore, in observation of the growth of the carbon nanofilaments, the deformation of the substrate was significant, regions where the carbon nanofilaments were grown could not be specified, and it was impossible to focus the microscope. FIG. 8 shows a photograph of the substrate after division and resulting carbon nanofilaments.

The invention claimed is:

1. A method for manufacturing a carbon nanostructure, comprising:
   a preparation step of preparing a substrate containing a carburizable metal as a main component; and
   a carbon nanostructure growth step of supplying a carbon-containing gas while heating the substrate,
   wherein the carbon nanostructure growth step includes gradually cleaving a heated portion of the substrate.

2. The method for manufacturing a carbon nanostructure according to claim 1, wherein the cleaving in the carbon nanostructure growth step is performed by subjecting the substrate to shearing.

3. The method for manufacturing a carbon nanostructure according to claim 1, wherein the heating in the carbon nanostructure growth step is performed by irradiating a cleaving portion of the substrate with a laser.

4. The method for manufacturing a carbon nanostructure according to claim 1, wherein the preparation step includes forming, in the substrate, a notch for inducing cleavage.

5. The method for manufacturing a carbon nanostructure according to claim 1, wherein the substrate in the carbon nanostructure growth step is not oxidized.

6. The method for manufacturing a carbon nanostructure according to claim 1, further comprising an observation step of observing a cleaving portion of the substrate in the carbon nanostructure growth step.

* * * * *